Sept. 27, 1966   K. R. LUNG   3,274,942
PUMPS
Filed Sept. 29, 1964
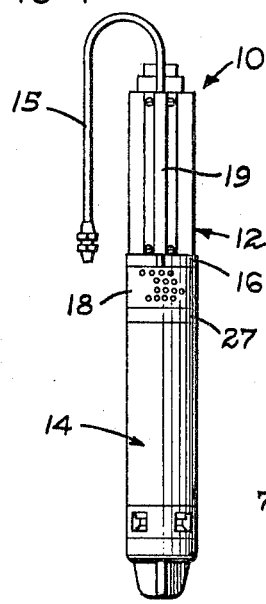
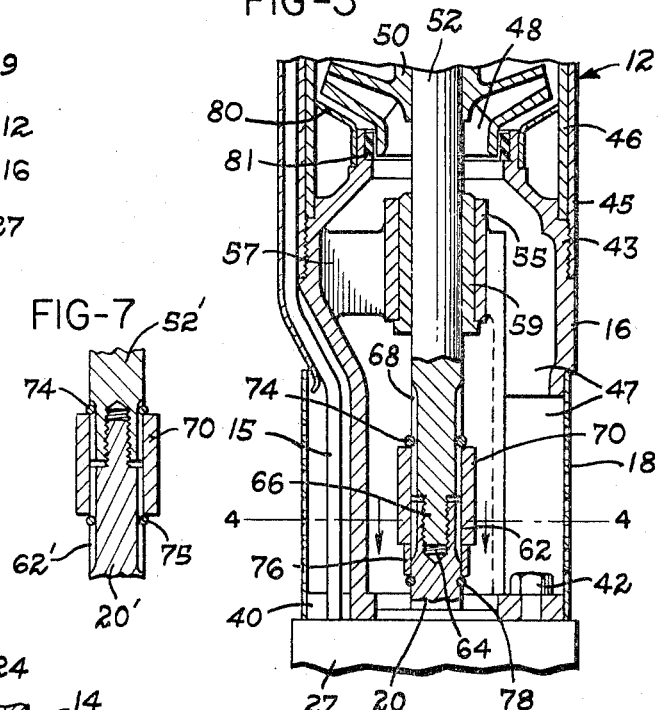
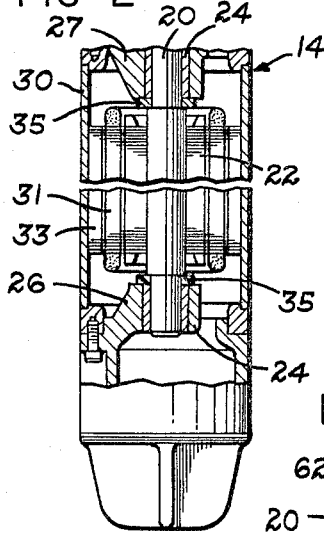
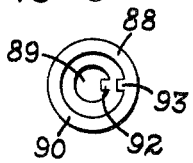
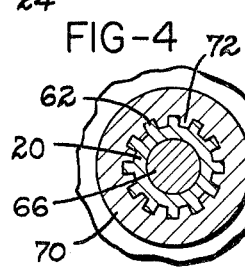
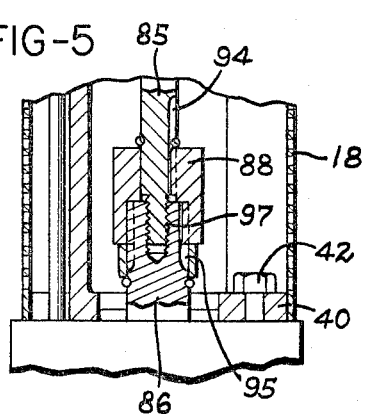
INVENTOR.
KENNETH R. LUNG
BY
Marechal, Biebel, French & Bugg
ATTORNEYS

United States Patent Office 3,274,942
Patented Sept. 27, 1966

3,274,942
PUMPS
Kenneth R. Lung, Morehead City, N.C., assignor to The Tait Manufacturing Company, Dayton, Ohio, a corporation of Ohio
Filed Sept. 29, 1964, Ser. No. 400,077
3 Claims. (Cl. 103—87)

This invention relates to submersible pumps, and more particularly, to a submersible motor-pump combination having a novel apparatus for coupling the motor shaft to the pump shaft.

The apparatus of the present invention is directed to a submersible pump assembly which is intended for submerging into a well, within the well casing, and which includes some means within the motor for opposing the axial thrust which is developed by the pump. The invention has particular reference to a motor pump assembly which may be easily assembled for economical manufacturing and disassembled for servicing and adjusting.

Accordingly, it is a primary object of the present invention to provide a submersible pump with a novel drive coupling apparatus for connecting the pump shaft to the motor shaft and which apparatus provides for simple assembly and disassembly of the motor and the pump.

As another object, the present invention provides a submersible pump with a novel drive coupling apparatus for positively locking the pump shaft to the motor shaft so that relative movement between the shafts, in both an axial direction and a rotary direction, is prevented.

A further object of the invention is to provide a submersible pump with a novel apparatus for coupling the pump shaft to the motor shaft and which apparatus includes a threaded connection to prevent relative axial movement between the shafts and a splined external coupling which is adapted to prevent relative rotation between the shafts.

Still another object of the invention is to provide an apparatus for connecting the pump shaft and the motor shaft of a submersible pump, wherein means are included to provide for incremental axial adjustments between the motor shaft and pump shaft so that the impellers mounted on the pump shaft may be simply but precisely spaced in relation to the pump housing.

As another object, the present invention provides a submersible pump with means within the motor to oppose the axial thrust on the motor shaft in either direction and with a novel shaft coupling apparatus which is adapted to transfer the axial thrust which develops in the pump shaft to the motor shaft.

As another object, the invention provides a submersible pump with a quickly removable coupling for connecting the pump shaft to the motor shaft and which coupling serves as a sleeve movable axially on the pump shaft in order to engage the motor shaft in a number of different positions to provide for incremental axial adjustment between the pump shaft and the motor shaft.

Other objects and advantages of the invention will be apparent from the following description, the accompanying drawing and the appended claims.

In the drawing—

FIG. 1 is an elevational view illustrating a submersible pump assembly incorporating the novel drive connection and means within the motor for opposing the axial thrust, in accordance with the invention;

FIG. 2 is an enlarged fragmentary view in axial section through the motor of the submersible pump assembly of FIG. 1;

FIG. 3 is an enlarged fragmentary view in axial section through the pump of the motor-pump assembly of FIG. 1;

FIG. 4 is an enlarged radial section as viewed along the line 4—4 of FIG. 3;

FIG. 5 is an enlarged fragmentary view in axial section through a pump showing a modification of the novel drive connection constructed in accordance with the invention;

FIG. 6 is a bottom end view of the modified coupling employed in the drive connection shown in FIG. 5; and FIG. 7 is an axial section view of the pump shaft, motor shaft and coupling showing a modified construction of the novel drive connection according to the invention.

Referring to the drawing, which illustrates a preferred embodiment of the present invention, the submersible pump assembly, generally referred to as 10, includes a pump 12, which is commonly of the multi-stage centrifugal type, a motor 14, motor leads 15, and an intake housing 16 which serves to connect the pump rigidly to the motor 14. A cylindrically shaped screen 18 is mounted around the intake housing 16 and serves to filter the water flowing into the pump 12, and the shield 19 serves to protect the leads 15.

As shown in the detail view of FIG. 2, the motor 14 generally includes a motor shaft 20 and rotor 22 which are rotatably mounted in the sleeve bearings 24 pressed within the end brackets 26 and 27. The motor casing 30 serves to support the end brackets 26 and 27 and also the stator 31, which is mounted within the cylindrically shaped yoke 33. Thrust bearings 35 are provided at each end of the rotor 22 on the motor shaft 20 and are adapted to rotate with the motor shaft 20 against the end of sleeve bearings 24 and serve to oppose the axial thrust in either direction which is transferred to the motor shaft 20 from the pump 12.

Referring to FIG. 3, the intake housing 16 includes an annular mounting flange 40 which is rigidly secured to the end bracket 27 of the motor 14 by the cap screws 42. The upper end of the intake housing 16 includes a threaded portion 43 which is adapted to receive the outer pump shell 45 and pump casing 46. A series of three open sections 47 are provided within the intake housing 16 to allow water to flow through the screen 18 and enter into the inlet portion 48 of the lower centrifugal impeller 50 which is on pump shaft 52 by a suitable fastening means (not shown).

Included as part of the intake housing 16 is a cylindrical retaining sleeve 55 which is coaxially spaced with the pump shaft 52 by a series of three ribs 57. The ribs 57 also serve to define the open sections 47 through which the water can flow to the impeller 50. Pressed firmly into the retaining sleeve 55 is a sleeve type bearing 59 in which one end of the pump shaft 52 is mounted for rotation.

As shown in FIG. 3, the upper end portion of the motor shaft 20 is provided with an external key means or spline 62 and an internal threaded hole 64 which is adapted to receive a threaded stud 66 extending from the lower end of the pump shaft 52. Also, the lower end portion of the pump shaft 52 is provided with an external key means or spline 68 which matches the external spline 62 on the motor shaft 20. It is to be understood, however, that the threaded connection could be reversed with the stud on the motor shaft and the hole within the pump shaft, as shown in FIG. 7.

In order to provide a positive drive connection between the motor shaft 20 and the pump shaft 52, a coupling 70 is provided which includes an internal spline 72 corresponding to the external splines 62 and 68 on the motor shaft 20 and pump shaft 52 respectively. The spline 68 on the pump shaft 52 extends upwardly on the pump shaft to such an extent that the coupling 70 may be moved upwardly out of engagement with the spline 62 on the motor shaft 20 after the retaining snap ring 74 is first disengaged from its seat and moved upwardly on the pump shaft 52. As an alternate construction, however, as shown in FIG. 7, the motor shaft 20' may be provided with an extended spline 62' so that the coupling 70 may be moved downwardly on the motor shaft out of engagement with the pump shaft 52' after the retaining snap ring 75 is released from its seat.

In order for the coupling 70 to engage the pump shaft 52 and motor shaft 20 by substantially equal amounts, a spacing sleeve 76 and another retaining snap ring 78, FIG. 3, are mounted on the motor shaft 20 and are adapted to cooperate with the retaining snap ring 74 for the balanced spacing of the coupling 70. While the spacing sleeve 76 and snap ring 78 are preferred for easy disassembling, it can be seen that these parts could be eliminated, in which case the end of the spline 62 would serve as the lower limit for the axial movement of the coupling 70 on the motor shaft 20.

As a result of the threaded connection between the stud 66 and threaded hole 64, it can be seen that the axial thrust which is developed by the pump impellers 50 will be transferred through the pump shaft 52 directly to the motor shaft 20 so that the shaft can be opposed by the thrust bearings 35 within the motor 14. The spline connection also provided by the coupling 70 also assures a positive drive arrangement of the pump shaft 52 by the motor shaft 20. In addition, the spline connection provides for minute axial adjustment between the pump shaft 52 and the motor shaft 20. This enables the impellers 50 to be precisely spaced in relation to the pump casing 46, deflector member 80, and clearance ring 81 in order to obtain a maximum pump efficiency. This is especially important when the impellers 50 are of the open face type rather than of the closed type, as shown. If, however, the axial adjustment feature is not needed, a suitable lock washer may be used between the pump shaft 52 and the motor shaft 20 surrounding the stud 66 so that the pump shaft is rigidly connected to the motor shaft.

To accomplish this axial adjustment, the coupling 70 is moved upwardly on the pump shaft 52 until the coupling 70 is free from the spline 62 on the motor shaft 20. The pump shaft 52 may then be rotated in relation to the motor shaft 20 until, as a result of the internal threaded connection, the desired axial spacing of the impeller 50 is made. At this point the spline 72, within the coupling 70, is aligned with the spline 62 on the motor shaft 20 so that the coupling 70 may be moved downwardly into engagement with the motor shaft 20. By providing an incremental axial adjustment which can be made by turning the spline coupling by one notch at a time, it is no longer necessary to maintain the close assembly tolerances to acquire accurate axial spacing of the impeller 50.

Referring to the modification of the drive connection shown in FIG. 5, the pump shaft 85 has a diameter smaller than the motor shaft 86. This requires that the coupling 88 be formed with a top opening 89, FIG. 6, which is somewhat smaller than the opening 90 in the lower end. As a further modification, the coupling 88 is provided with a single key 92 within the opening 89 and a similar single key 93 within the opening 90 in place of a continuous spline as shown on the coupling 70 in FIG. 4. These keys are adapted to engage the key way 94 formed in the pump shaft 85 and one of the keyways 95 in the motor shaft 86, respectively.

While a single key and a keyway do not provide the extremely fine axial adjustment that a continuous spline offers, it has been found that by providing the threaded connection 97 with suitably fine threads, sufficient axial adjustment is obtainable. Furthermore, it is to be understood that the one or more keys and keyways may be replaced by one or more flats without departing from the scope of the invention.

Another important feature which results from the coupling, as described above, is the simplicity by which the motor 14 may be removed from the intake housing 16 and pump 12. This is accomplished merely by removing the screen 18, the cap screws 42 and moving the retaining ring 74 and the coupling 70 upwardly on the pump shaft 52 so that the motor shaft 20 can be easily unthreaded from the pump shaft 52. This simplicity of disassembly especially is convenient and desirable when it is necessary to service the submersible pump or to exchange the motor 14. Furthermore, the simplified connection for between the pump shaft 52 and motor shaft 20 is desirable from a manufacturing standpoint in that the connection is adapted for quick assembly and adjustment.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a submersible pump including a motor having a submersible casing and a projecting motor shaft having external key means formed on the end portion thereof, an inlet housing rigidly mounted on one end of said motor casing, a pump casing rigidly connected to the other end of said inlet housing, a pump shaft rotatably mounted within said inlet housing and including external key means formed on the end portion thereof, at least one impeller mounted on said pump shaft in spaced relationship with said pump casing, threaded means for connecting said pump shaft to said motor shaft in aligned spaced relationship, and a coupling surrounding the end portions of said pump and motor shafts and having internal key means for engaging said external key means on said pump and motor shafts to provide a positive drive connection therebetween, the improvement comprising means for slidably mounting said coupling on at least one of said shafts to provide for axial shifting of said coupling for disengaging the positive drive connection between said pump and motor shafts without changing said aligned spaced relationship of said shafts so that said pump shaft can be rotated relative to said motor shaft to provide axial adjustment between said shafts for spacing said impeller precisely in relation to said pump casing without disassembling said pump.

2. A submersible pump as defined in claim 1 including releasable retaining means for preventing axial shifting of said coupling on said shaft and release of driving engagement when said pump is running.

3. A submersible pump as defined in claim 2 wherein said external key means on said shafts and said internal key means within said coupling define interlocking circumferential splines to provide incremental axial adjustment between the shafts.

References Cited by the Examiner

UNITED STATES PATENTS

| 2,283,195 | 5/1942 | Farrelle et al. | 103—87 |
| 3,025,800 | 3/1962 | Wolfe et al. | 103—87 |

FOREIGN PATENTS

| 387,843 | 2/1933 | Great Britain. |

ROBERT M. WALKER, Primary Examiner.